US012643526B2

(12) United States Patent　(10) Patent No.:　US 12,643,526 B2
Lee et al.　(45) Date of Patent:　Jun. 2, 2026

(54) BRAKE CREEP GROAN COUNTERMEASURE SYSTEMS AND METHODS

(71) Applicant: GM GLOBAL TECHNOLOGY OPERATIONS LLC, Detroit, MI (US)

(72) Inventors: Jeehyung Lee, Seoul (KR); Seokju Yong, Incheon (KR); Bongbum Back, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 467 days.

(21) Appl. No.: 18/454,392

(22) Filed: Aug. 23, 2023

(65) Prior Publication Data

US 2025/0065859 A1　Feb. 27, 2025

(51) Int. Cl.
　　*B60T 17/22*　　(2006.01)
　　*B60T 8/172*　　(2006.01)
(52) U.S. Cl.
　　CPC ............ *B60T 17/221* (2013.01); *B60T 8/172* (2013.01)
(58) Field of Classification Search
　　CPC ........ B60T 17/221; B60T 8/172; B60T 13/68; B60T 7/042; B60T 13/146; B60T 13/662; B60T 13/686; B60T 2201/06
　　See application file for complete search history.

(56) References Cited

U.S. PATENT DOCUMENTS

| | | | |
|---|---|---|---|
| 8,265,846 B2 | 9/2012 | Kinser et al. | |
| 10,343,660 B2 | 7/2019 | Rizzo et al. | |
| 10,351,118 B2 | 7/2019 | Schumann et al. | |
| 2004/0183366 A1* | 9/2004 | Kamiya | B60T 17/221 303/11 |
| 2007/0216224 A1* | 9/2007 | Schmitt | B60T 8/00 303/DIG. 1 |
| 2018/0170331 A1 | 6/2018 | Barber et al. | |
| 2019/0001942 A1* | 1/2019 | Spieker | B60T 8/171 |
| 2024/0294150 A1* | 9/2024 | Yong | B60T 8/171 |

FOREIGN PATENT DOCUMENTS

KR　　　　20190138177　　　* 12/2019

* cited by examiner

*Primary Examiner* — Pamela Rodriguez
(74) *Attorney, Agent, or Firm* — Ingrassia Fisher & Lorenz, LLP | IF&L

(57)　　　　　　ABSTRACT

Methods and systems are provided for controlling braking to avoid groan noise in a braking system. The system has a brake actuator configured to apply a friction force to a moving member, a conduit system coupled with the brake actuator, an inlet valve in the conduit system configured to control fluid pressure delivered to the brake actuator, and an outlet valve in the conduit system configured to control fluid pressure released from the brake actuator. The system includes a controller to monitor for an upper target pressure condition in the braking system, wherein the upper target pressure condition is associated with a noise zone; and operate, when the upper target pressure is detected and in a noise zone avoidance mode, the inlet valve and the outlet valve to avoid brake pressures that generate a brake noise from the friction force.

20 Claims, 6 Drawing Sheets

FIG. 1

BRAKE CREEP GROAN COUNTERMEASURE SYSTEMS AND METHODS

INTRODUCTION

The present disclosure generally relates to the control of a braking system, and more specifically to methods and systems for controlling a vehicle braking system with countermeasures to avoid the creation of brake creep groan noise.

Braking systems are generally included in mechanical systems that have moving parts that are preferably slowed and/or brought to a controlled stop when desired. Braking generally involves using friction to avert movement. Various friction material options may be employed depending on the application. Brake creep groan is a sound generated by brakes when pressure is applied between the brake friction pads and the mating brake surface when the vehicle is starting to move from a stopped condition. For example, the sound may result from vibrations created as a vehicle moves with the brakes in a state of application and may be transmitted and amplified by propagating through the vehicle's structure. The sound may be undesirable and may be classified as a noise. Brake creep groan noise may be perceived by a vehicle occupant in both sound and feel sensations during brake release and/or application.

Brake creep groan noise generation may be detected during vehicle development and may be addressed by changing design parameters such as the friction material used in brake pads. When the development of a vehicle is at an advanced stage or is complete, changing design parameters is generally undesirable.

Accordingly, it is desirable to provide systems and methods for addressing brake creep groan noise without changing the physical elements of a vehicle. Such systems and methods may desirably be generally applicable to various braking applications. Furthermore, other desirable features and characteristics of the present disclosure will become apparent from the subsequent detailed description and the appended claims, taken in conjunction with the accompanying drawings and the foregoing introduction.

SUMMARY

Systems and methods are provided for controlling braking to avoid groan noise in a braking system. The system may have a brake actuator to apply a friction force to a moving member, a conduit system coupled with the brake actuator, an inlet valve in the conduit system to control fluid pressure delivered to the brake actuator, and an outlet valve in the conduit system to control fluid pressure released from the brake actuator. The system includes a controller to monitor for an upper target pressure condition in the braking system, where the upper target pressure condition is associated with a noise zone. The system may operate, when the upper target pressure is detected and in a noise zone avoidance mode, the inlet valve and the outlet valve to avoid brake pressures that generate a brake noise from the friction force.

In additional embodiments, the controller monitors for a vehicle start event and, following the vehicle start event, conducts the monitoring for the upper target pressure condition in the system.

In additional embodiments, the controller counts a number of brake applications following a vehicle start event and skips the monitor for the upper target pressure when the number of the brake applications exceeds a threshold value.

In additional embodiments, the controller determines, by a slope sensor, whether there is a slope that affects the brake noise. When the slope is present and when the upper target pressure is detected, the inlet valve and the outlet valve are controlled in a slope mode.

In additional embodiments, the controller determines, via a brake apply actuator, if an increase in pressure is applied. When the increase in pressure is applied, the noise zone avoidance mode is exited.

In additional embodiments, the system is included in a vehicle and the controller determines whether the vehicle is operating on a slope. When the vehicle is not operating on the slope and the upper target pressure is detected, the inlet valve and the outlet valve are controlled in a normal mode. When the vehicle is operating on the slope and the upper target pressure is detected, the inlet valve and the outlet valve are controlled in a slope mode that is different than the normal mode and that is tailored to the slope.

In additional embodiments, the controller determines whether a lower pressure target is detected, and when the lower pressure target is detected the noise zone avoidance mode is exited.

In additional embodiments, the controller determines whether a lower pressure target is detected, and when the lower pressure target is not detected, continues to operate in the noise zone avoidance mode.

In additional embodiments, the system is included in a vehicle and the controller determines, by a speed sensor, a speed of the vehicle. Monitoring for the upper target pressure is skipped when the speed exceeds a threshold value.

In additional embodiments, the controller controls a pressure booster to regulate deceleration.

In a number of other embodiments, a method for controlling braking includes applying, by a brake actuator, a friction force to a moving member. A conduit system is coupled with the brake actuator. An inlet valve in the conduit system controls a fluid pressure delivered to the brake actuator. An outlet valve in the conduit system controls the fluid pressure released from the brake actuator. A controller monitors for an upper target pressure condition in the system, where the upper target pressure condition is associated with a noise zone. When the upper target pressure is detected, the controller operates in a noise zone avoidance mode, controlling the inlet valve and the outlet valve to avoid brake pressures that would generate a brake noise from the friction force.

In additional embodiments, the controller monitors for a vehicle start event. Following the vehicle start event, the controller conducts the monitoring for the upper target pressure condition in the system.

In additional embodiments, the controller counts a number of brake applications following a vehicle start event. When the number of the brake applications exceeds a threshold value, the controller skips the monitoring for the upper target pressure.

In additional embodiments, the controller references a slope sensor and determines whether there is a slope that affects the brake noise. When the slope is present and when the upper target pressure is detected, the inlet valve and the outlet valve are operated in a slope mode.

In additional embodiments, the controller references a brake apply actuator and determines if an increase in pressure is applied. When the increase in pressure is applied, the controller exits the noise zone avoidance mode.

In additional embodiments, the system is included in a vehicle. The controller determines whether the vehicle is operating on a slope. When the vehicle is not operating on the slope and the upper target pressure is detected, the inlet valve and the outlet valve are controlled in a normal mode. When the vehicle is operating on the slope and the upper target pressure is detected, the inlet valve and the outlet valve are controlled in a slope mode that is different than the normal mode and that is tailored to the slope.

In additional embodiments, the controller determines whether a lower pressure target is detected, and when the lower pressure target is detected the noise zone avoidance mode is exited.

In additional embodiments, the controller determines whether a lower pressure target is detected. When the lower pressure target is not detected, the controller continues to operate the system in the noise zone avoidance mode.

In additional embodiments, the system is included in a vehicle. The controller references a speed sensor and determines a speed of the vehicle. When the speed exceeds a threshold value, the controller skips the monitoring for the upper target pressure.

In a number of additional embodiments, a vehicle includes a system for controlling braking. A brake actuator functions to apply a friction force to a moving member. A conduit system is coupled with the brake actuator. An inlet valve is disposed in the conduit system to control fluid pressure delivered to the brake actuator. An outlet valve is disposed in the conduit system to control fluid pressure released from the brake actuator. A controller monitors for an upper target pressure condition in the system. When the upper target pressure is detected, the system is controlled in a noise zone avoidance mode, where the inlet valve and the outlet valve are controlled to avoid brake pressures that generate a brake noise from the friction force.

DESCRIPTION OF THE DRAWINGS

The exemplary embodiments will hereinafter be described in conjunction with the following drawing figures, wherein like numerals denote like elements, and wherein:

FIG. 1 is a functional diagram of a vehicle that includes a braking system and a control system capable of groan control, in accordance with an exemplary embodiment;

DETAILED DESCRIPTION

Figure 2:
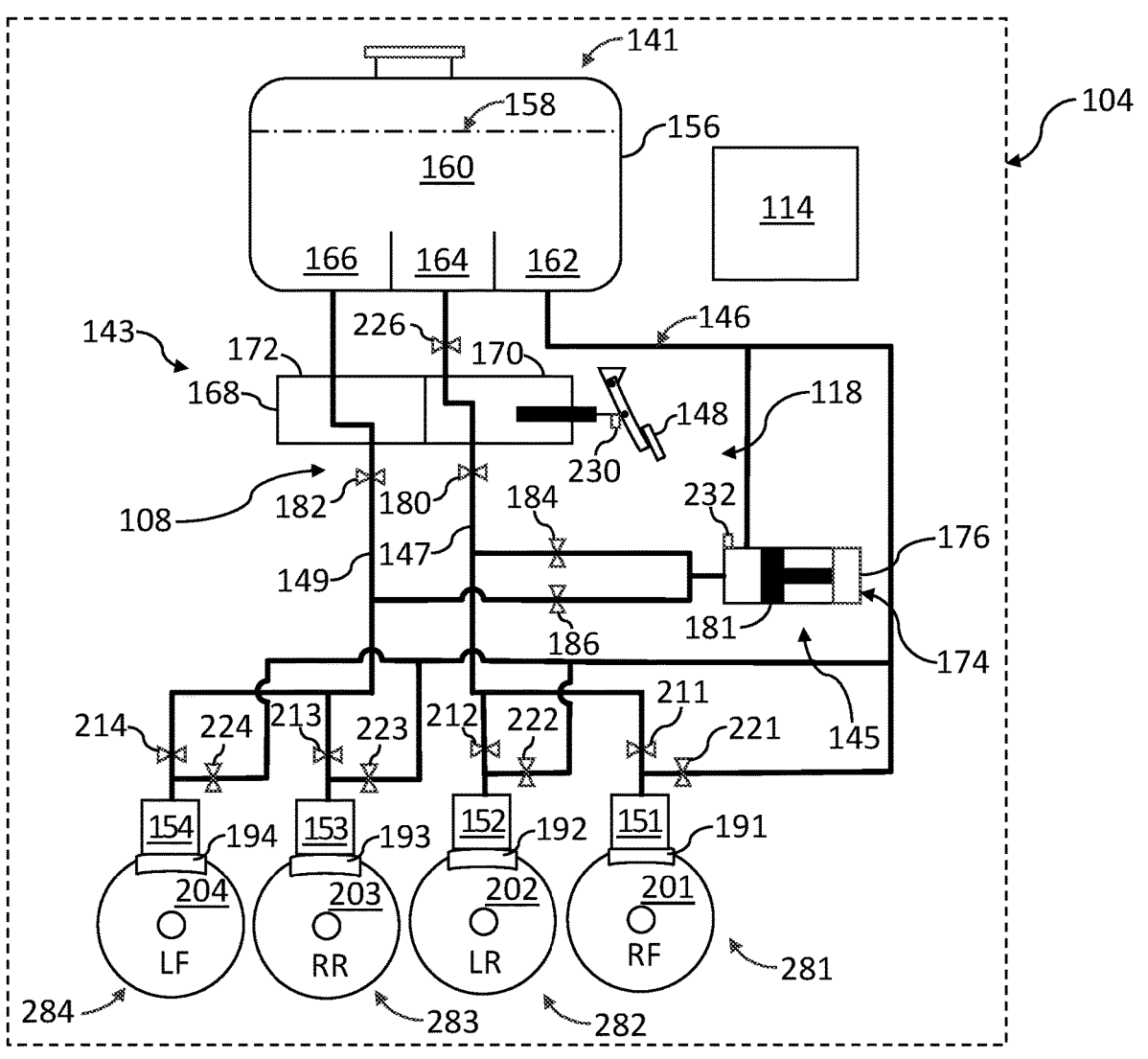
FIG. 2 is a functional diagram illustrating the braking system of the vehicle of FIG. 1, in accordance with an exemplary embodiment.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
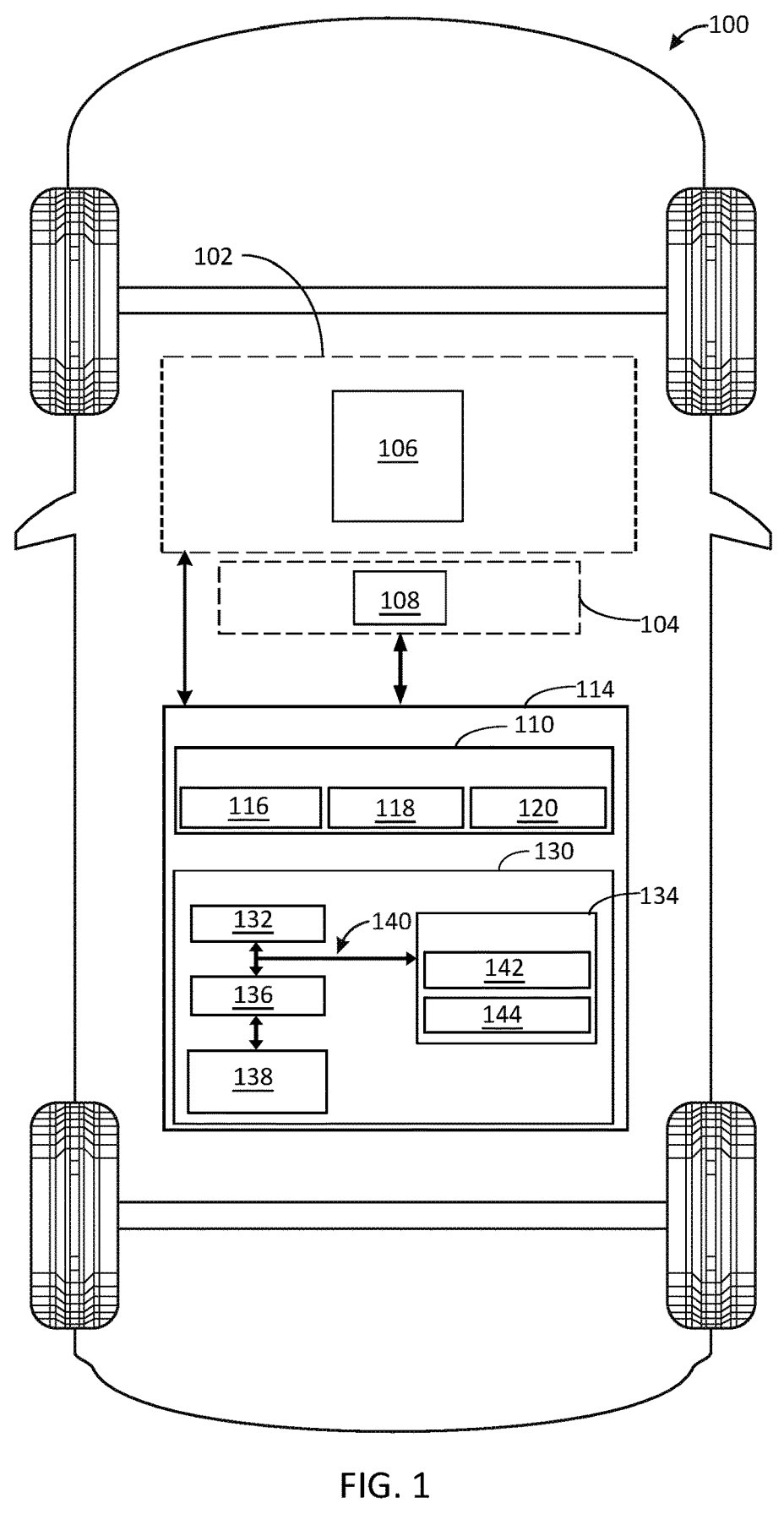

Referring to FIG. 1, illustrated is a vehicle 100, having a powertrain system 102 according to an exemplary embodiment. In various embodiments, the powertrain system 102 includes a prime mover that may be an engine and/or a motor. The prime mover operates to propel the vehicle 100 based on a requested load that may be commanded by a driver or by autonomous input for torque and/or speed. In certain embodiments, the vehicle 100 comprises an automobile. As will be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a truck, a watercraft, an aircraft, and/or one or more other types of vehicles. In addition, in various embodiments, it will also be appreciated that the vehicle 100 may comprise any number of other types of mobile platforms with a propulsion system such as the powertrain system 102.

In the depicted embodiment, the vehicle 100 includes a body that substantially encloses other components of the vehicle 100. Also in the depicted embodiment, the vehicle 100 includes a plurality of axles and wheels. The wheels are each rotationally coupled, such as by a suspension, to one or more of the axles near a respective corner of the body to facilitate movement of the vehicle 100. In one embodiment, the vehicle 100 includes four wheels, although this may vary in other embodiments (for example for trucks and certain other vehicles).

The vehicle 100 includes the powertrain system 102 for propulsion of the vehicle 100. The powertrain system 102 drives the wheels to rotate in a forward direction or a backward direction. The powertrain system 102 generally includes a number of components and subsystems operating in coordination to power the vehicle 100 and includes an actuator system 106 to effect various control actions. The vehicle 100 includes a braking system 104 associated with one or more of the wheels which is configured to apply friction force to slow the vehicle 100. The braking system 104 includes a number of components and subsystems operating in coordination to brake the vehicle 100 and includes an actuator system 108 to effect various control actions.

The vehicle 100 further includes a control system 114 associated with various systems of the vehicle 100 including the powertrain system 102 and the braking system 104. In various embodiments, the control system 114 provides instructions for controlling various aspects of the vehicle 100 including through the actuator systems 106, 108. In various embodiments, the control system 114 comprises an engine control unit (ECU) for the powertrain system 102 and an electronic brake control module (EBCM) for the braking system 104. In other embodiments, the control system 114 may include any number of individual controllers. In various embodiments, among other functionality, the control system 114 selectively controls operation of the actuators systems 106, 108. In various embodiments, the control system 114 provides these functions in accordance with the steps of the methods described further below in connection with FIGS. 5 and 6.

As depicted in FIG. 1, in various embodiments, the control system 114 includes a sensor array 110 and the controller 130. In some embodiments, the actuator systems 106, 108 may be considered a part of the control system 114. In various embodiments, the sensor array 110 includes sensors for measuring observable conditions, including of the powertrain system 102 and of the braking system 104, and for generating sensor data based thereon. As depicted in FIG. 1, in various embodiments, the sensor array 110 includes one or more prime mover sensors 116. In various embodiments, the prime mover sensors 116 are attached to, disposed within, or otherwise disposed in proximity to the powertrain system 102 such that various temperatures, positions, speeds, and other observable parameters are measured. In various embodiments, the sensor array 110 includes one or more braking sensors 118. In various embodiments, the braking sensors 118 are attached to, disposed within, or otherwise disposed in proximity to the braking system 104 such that various positions, pressures, speeds, and other observable parameters are measured. In certain embodiments, the sensor array 110 may also include one or more other sensors 120, for example for operation of the powertrain system 102, the braking system 104, and/or of other systems and devices of the vehicle 100. For example, in certain embodiments, the other sensors 120 may include one or more sensors for detecting when the powertrain system 102 is turned on and/or running, one or more load sensors, such as a throttle position sensor, for detecting load requests of the powertrain system 102, one or more wheel speed sensors, for detecting wheel speeds, and other sensors as desired.

In various embodiments, the controller 130 is coupled with the sensor array 110 and provides instructions for controlling the powertrain system 102 and/or the braking system 104, such as through the actuator systems 106, 108 via commands based on the sensor data. As depicted in FIG.

1, the controller 130 comprises a computer system. In certain embodiments, the controller 130 may also include the sensor array 110 and/or one or more other vehicle components, such as the actuator systems 106, 108. In addition, it will be appreciated that the controller 130 may differ from the embodiment depicted in FIG. 1. For example, the controller 130 may be coupled with or may otherwise utilize one or more remote computer systems and/or other control systems, for example as part of one or more of the above-identified vehicle devices and systems.

In the depicted embodiment, the computer system of the controller 130 includes a processor 132, a memory 134, an interface 136, a storage device 138, and a bus 140. The processor 132 performs the computation and control functions of the controller 130 and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 130 and the computer system of the controller 130, generally in executing the processes described herein, such as the processes discussed further below in connection with FIGS. 5 and 6.

The memory 134 may be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144 (e.g., including, in various embodiments, predetermined threshold values for controlling particulate emissions).

The bus 140 serves to transmit programs, data, status and other information or signals between the various components of the computer system of the controller 130. The interface 136 allows communications with the computer system of the controller 130, for example from a system driver and/or another computer system and is implemented using any suitable method and apparatus. In one embodiment, the interface 136 obtains the various data from the sensor array 110, the powertrain system 102, the braking system 104, and/or one or more other components and/or systems of the vehicle 100. The interface 136 may include one or more network interfaces to communicate with other systems or components. The interface 136 may also include one or more network interfaces to communicate with technicians, and/or one or more storage interfaces to connect to storage apparatuses, such as the storage device 138.

The storage device 138 may be any suitable type of storage apparatus, including various different types of direct access storage and/or other memory devices. In one exemplary embodiment, the storage device 138 comprises a program product from which the memory 134 receives a program 142 that executes one or more embodiments of one or more processes of the present disclosure, such as the steps of the processes discussed further below in connection with FIGS. 5 and 6. In another exemplary embodiment, the program product may be directly stored in and/or otherwise accessed by the memory 134 and/or the storage device 138 and/or other memory devices.

The bus 140 may be any suitable physical or logical means of connecting computer systems and components. This includes, but is not limited to, direct hard-wired connections, fiber optics, infrared, and wireless bus technologies. During operation, the programs 142 are stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

With reference to FIG. 2, the braking system 104 is shown schematically. In various embodiments, the braking system 104 may be specifically associated with the vehicle 100, however the current disclosure is not limited to vehicle applications. In general, the braking system 104 includes a fluid source 141, an apply system 143, a boost system 145, the actuator system 108, a conduit system 146, and includes or is associated with the control system 114. The braking system 104 also includes a brake apply actuator 148 and wheel brake actuators 151-154, which may be a part of the actuator system 108. For example, in certain embodiments, such as for autonomous control, the brake apply actuator 148 may be operated by the control system 114.

In the current embodiment, the fluid source 141 includes a brake fluid reservoir 156 that stores and supplies fluid used in the braking system 104. The brake fluid reservoir 156 holds fluid 158 and includes a shared volume 160, and three separated volumes including a booster volume 162, a primary volume 164 and a secondary volume 166.

The apply system 143 includes a master cylinder 168, which is connected with the brake fluid reservoir 156 and with the brake apply actuator 148. The master cylinder 168 is configured to receive inputs from the brake apply actuator 148 and to communicate those brake apply inputs to the conduit system 146 through a primary circuit 147 and a secondary circuit 149. The inputs may be manual, such as from a driver of the vehicle 100, and/or may be automatic, such as controlled by the control system 114 in an autonomous mode. The master cylinder 168 delivers pressure to separate branches (primary circuit 147 and secondary circuit 149), of the conduit system 146 through a primary cylinder 170 and a secondary cylinder 172. The primary cylinder 170 is fluidly connected with the primary volume 164 and the secondary cylinder 172 is fluidly connected with the secondary volume 166.

The boost system 145 includes a pressure booster 174 and an actuator 176. In the current embodiment, the boost system 145 may be an e-boost system with an electro-hydraulic booster that interprets brake command inputs at the brake apply actuator 148 and uses the actuator 176, such as a motor, to move a plunger 181 to displace the brake fluid in the conduit system 146 to one or more of the wheel brake actuators 151-154 (which may be referred to as brake corners, or which may be disposed at brake corners), of the vehicle 100.

The conduit system 146 includes various fluid conduits such as tubes, hoses, passages, etc. that communicate fluid pressure, including through the primary circuit 147 and the secondary circuit 149. Various valves are disposed in the conduit system 146 and are coupled with the control system 114 to control how and when pressure is communicated. This includes a primary master cylinder valve 180 in the primary circuit 147 that is operable to open and to close to allow or to prevent/control fluid pressure communication between the wheel brake actuators 151, 152 and the primary cylinder 170. The primary master cylinder valve 180 may be a normally open valve so that in the event of a lack of power supply, the primary cylinder 170 is in open communication with the wheel brake actuators 151, 152. The primary master cylinder valve 180 may be controlled to close to inhibit feedback from the pressure booster 174 to the brake apply actuator 148. Similarly, a secondary master cylinder valve 182 in the secondary circuit 149 is operable to open and to close to allow or to prevent, or to modulate, fluid pressure communication between the wheel brake actuators 153, 154 and the secondary cylinder 172. The secondary master cylinder valve 182 may be a normally open valve so that in the event of a lack of power supply, the secondary cylinder 172 is in open communication with the wheel brake actuators 153, 154. The secondary master cylinder valve 182 may be controlled to close to inhibit feedback from the pressure booster 174 to the brake apply actuator 148. In embodiments, the primary master cylinder valve 180 and the secondary master cylinder valve 182 may be variably controlled to allow a partial pressure communication, such as for tuned feedback.

The valves also include a primary boost separation valve 184 and a secondary boost separation valve 186. The primary boost separation valve 184 is operable to allow or prevent or modulate the communication of fluid/pressure between the pressure booster 174 and the primary circuit 147. The secondary boost separation valve 186 is operable to allow or prevent or modulate the communication of fluid/pressure between the pressure booster 174 and the secondary circuit 149. For example, during un-boosted brake apply by the brake apply actuator 148, the primary boost separation valve 184 and the secondary boost separation valve 186 may be closed to direct pressure to the wheel brake actuators 151-154.

In addition, each of the wheel brake actuators 151-154 includes a pair of valves to control pressure at each corner (specifically at the respective wheel brake actuator 151-154). The wheel brake actuators 151-154 may include cylinders with pistons that are responsive to fluid pressure to brake the vehicle 100 through friction pads 191-194 that engage moving members such as rotating elements designated as rotors 201-204. In other embodiments, the rotating elements may be drums, shafts, plates, etc. The pairs of valves for the wheel brake actuators 151-154 each include a respective inlet valve 211-214 and a respective outlet valve 221-224. Each inlet valve 211-214 is individually controlled to admit pressure from the pressure booster 174 and/or the master cylinder 168 to the respective wheel brake actuator 151-154. Each outlet valve 221-224 is individually controlled to relieve pressure from the respective wheel brake actuator 151-154 to the brake fluid reservoir 156. As such, the pressure at each corner through the wheel brake actuators 151-154 is individually controlled by the control system 114.

In the current embodiment, there are four corners 281-284 for the vehicle 100. The right front corner 281 includes the wheel brake actuator 151, and is associated with the friction pad 191, the rotor 201, the inlet valve 211 and the outlet valve 221. The left rear corner 282 includes the wheel brake actuator 152, and is associated with the friction pad 192, the rotor 202, the inlet valve 212 and the outlet valve 222. The right rear corner 283 includes the wheel brake actuator 153, and is associated with the friction pad 193, the rotor 203, the inlet valve 213 and the outlet valve 223. The left front corner 284 includes the wheel brake actuator 154, and is associated with the friction pad 194, the rotor 204, the inlet valve 214 and the outlet valve 224. The brake pressure circuit is separated with the right front corner 281 and the left rear corner 282 connected in the primary circuit 147, while the left front corner 284 and the right rear corner 283 are connected in the secondary circuit 149.

The various valves also include a test valve 226 that may be operated, such as by the control system 114 for diagnostic purposes. It should be appreciated that each of the valves 180, 182, 184, 186, 211-214, 221-224 and 226 are coupled with the controller 130 and are responsive to the processor 132 to precisely control fluid/pressure admitted through the respective valve.

The braking system 104 also includes various sensors, such as those of the braking sensors 118. For example, a brake apply sensor 230, senses the amount of brake actuation by the operator at the brake apply actuator 148. In embodiments, such as in autonomous control, brake apply may be sensed, such as by the brake apply sensor 230, or may be a value retrieved from the memory 134 for controlled brake application. The braking sensors 118 may also include a boost pressure sensor 232 that monitors the boost pressure. The boost pressure may also be referred to as the plunger pressure since it is generated by the plunger 181. In some embodiments, pressure sensors may be included at each of the brake corners 281-284, such as to monitor the pressure at each of the wheel brake actuators 151-154. In other embodiments, during calibration, the control parameters may be determined and stored so that feedback control is not needed.

In various embodiments, the controller 130 may receive information in signals from the various sensors of the sensor array 110, process that information, and send control signals/commands to the various actuators of the actuator systems 106, 108 for operation of the powertrain system 102 and the braking system 104. The sensor array 110 senses observable conditions, including of the braking system 104. In various embodiments, the sensed values include data associated with the requested braking force, such as by the brake apply actuator 148, and with the pressure at each corner 281-284, such as from the boost pressure sensor 232.

Figure 3:
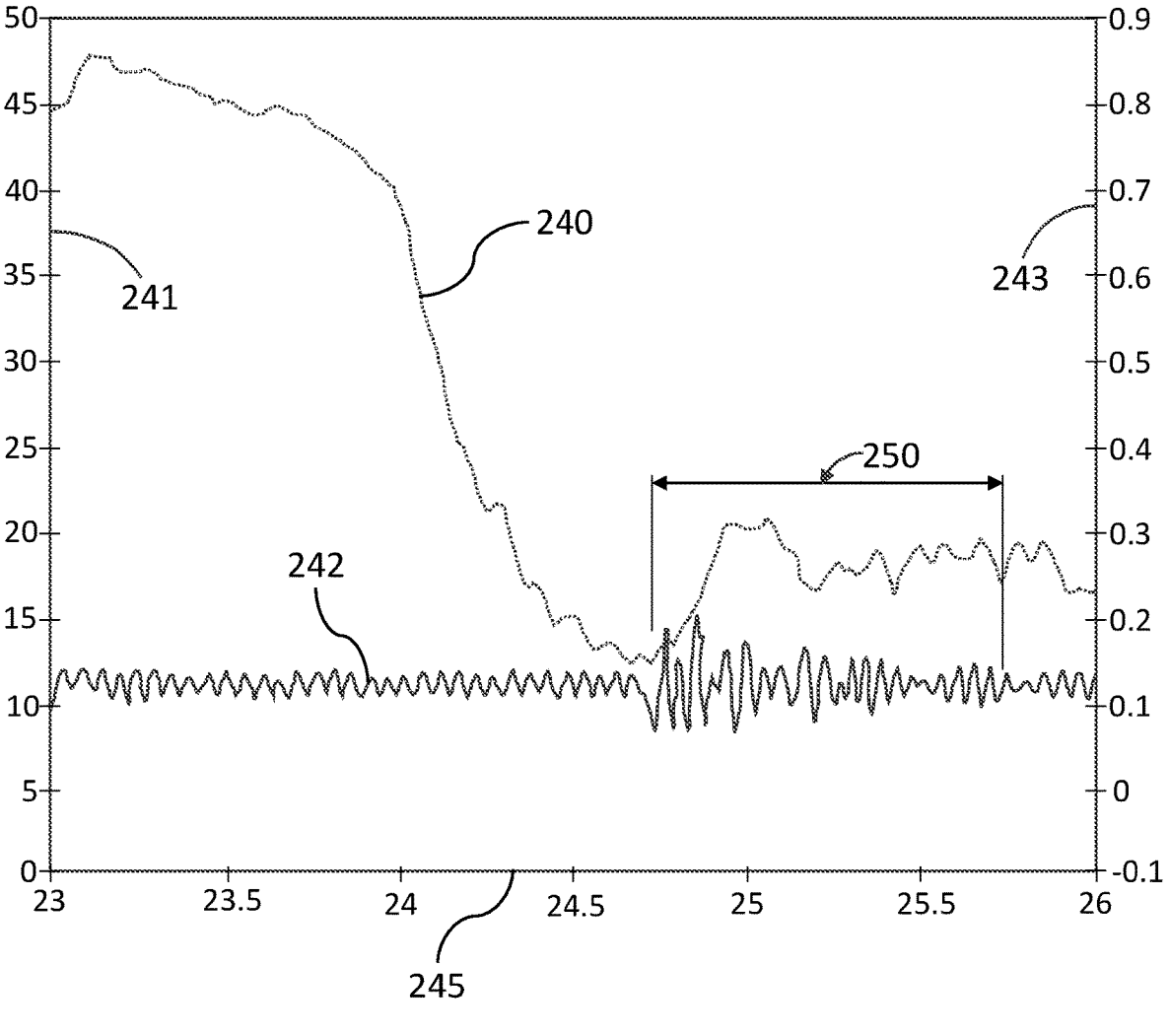
FIG. 3 is a graph of pedal force and deceleration versus time for the vehicle of FIG. 1 and the braking system of FIG. 2, in accordance with an exemplary embodiment.

During operation of the braking system 104, in response to controlled pressure delivery, the friction pads 191-194 act on the rotating elements, such as rotors 201-204 applying a friction force. Changes in applied pressure between the two components result in various dynamic responses, such as vibrations, some of which result in generated sounds that may be perceivable. Under certain conditions, a vibration spike may occur that may particularly contribute to sound generation, which may be objectionable noise such as groan. For example, pressure bands may exist where detectable and unwanted noise is generated. Such a band is demonstrated in FIG. 3 to which reference is directed. Curve 240 illustrates brake apply force in Newtons as depicted on the left vertical axis 241, such as by the brake apply actuator 148. The brake apply force translates to a request for pressure from the boost system 145. Curve 242 illustrates deceleration in gravitational units (g) as depicted on the right vertical axis 243, which results from the pressure delivered to the corners 281-284, such as through the wheel brake actuators 151-154. Time in seconds is depicted on the horizontal axis 245. The graph of FIG. 3 illustrates that as brake apply force is relieved (as depicted by the curve 240) a noise zone 250 (groan noise zone) exists where a vibration spike occurs on the curve 242. This may be an identifiable noise zone 250 and may be referred to as groan noise generated by the braking system 104. In a number of embodiments described below, avoiding this noise zone 250 may be accomplished through control of the inlet valves 211-214 and the outlet valves 221-224 to avoid pressures at the corners 281-284 that generate groan in a groan noise zone avoidance mode.

Figure 4:
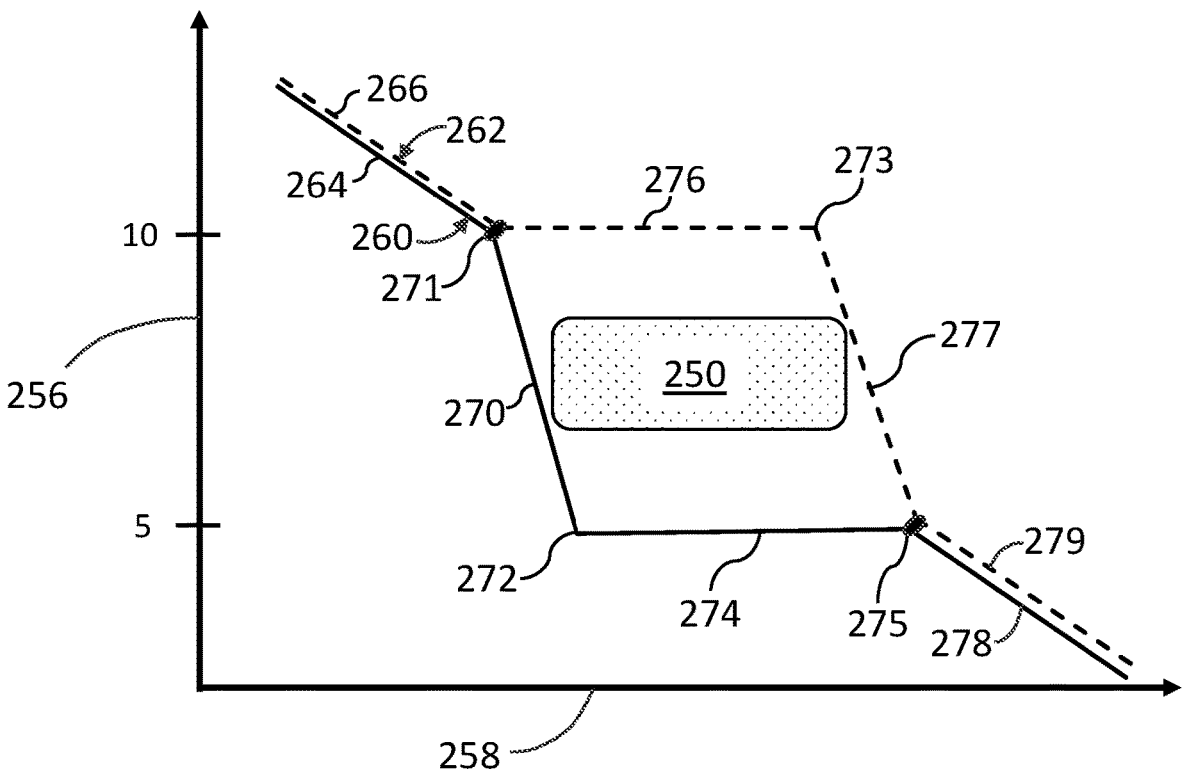
FIG. 4 is a graph of pressure versus brake pedal position for the vehicle of FIG. 1 and the braking system of FIG. 2, in accordance with an exemplary embodiment.

Referring to FIG. 4, a graph illustrates boosted pressure of the braking system 104 on the vertical axis 256 in bar (such as may be received from the boost pressure sensor 232). The graph of FIG. 4 also depicts pedal release on the horizontal ais 258 in Newtons (such as sensed by the brake apply sensor 230). Within these parameters the noise zone 250 may exist as a function of pressure and pedal release where groan is generated. The noise zone 250 may be identified by characteristic testing and/or modelling of the braking system 104 in the vehicle 100 and may be stored in memory 134. A brake corner pressure curve 260 is schematically shown for the front brake corners 281, 284 and a brake corner pressure curve 262 is illustrated for the rear brake corners 282, 283. The corner pressure curve 260 and the corner pressure curve 262 each includes a respective segment 264, 266 during which the brake apply actuator 148 is progressively released and the boost pressure progressively reduces, along a common profile. Along the segments 264, 266 the respective inlet valves 211-214 are moved in opening direction and the respective outlet valves 221-224 are moved in closing directions. If the trend of the segments 264, 266 is continued, the corner pressure curves 260, 262 would transect the noise zone 250. To avoid the noise zone 250, beginning at the point 271, the inlet valves 211-214 and/or the outlet valves 221-224 are actuated to vary the pressure at each of the wheel brake actuators 151-154.

For the plunger pressure applied to the front corners 281, 284 following the point 271, the result of the control actions is depicted by a segment 270 where the inlet valves 211, 214 are moved in a closing direction and the outlet valves 221, 224 are moved in an opening direction to increase the rate of the reduction in pressure at the front corners 281, 284 avoiding the noise zone 250. When the pressure reaches a point 272, that is lower than the noise zone 250, as defined, the inlet valves 211, 214 remain in a closing direction and the outlet valves 221, 224 are moved in a closing direction and the curve 260 follows the segment 274 to maintain a pre-defined front brake pressure, such as approximately 5 bar, while the corner pressure curve 260 moves to point 275. As a result, the pressure generated by the wheel brake actuators 151 and 154 at the corners 281, 284 avoids the noise zone 250 and avoids groan.

For the plunger pressure as applied to the rear corners 282, 283 from the point 271, the result of the control actions is depicted by a segment 276 where the inlet valves 212, 213 are moved in a closing direction and the outlet valves 222, 223 are moved in a closing direction to maintain rear brake pressure, such as approximately 10 bar, for compensating total brake torque avoiding the noise zone 250 at the rear corners 282, 283 and the pressure moves to point 273. When the plunger pressure reaches a predefined pressure which is lower than the noise zone 250, the inlet valves 212, 213 are moved in a closing direction and the outlet valves 222, 223 are moved in an opening direction through the segment 277 to increase the rate of reduction in pressure at the rear corners 282, 283 and the rear corner pressure curve 262 moves to point 275.

From the point 275, the front corner pressure curve 260 and the rear corner pressure curve 262 include respective segments 278, 279 that, in exit control, include moving the inlet valves 211-214 in an opening direction and moving the outlet valves in a closing direction with the same profile in this embodiment. Through the control actions, the pressures in the braking system 104 avoid the noise zone 250 and groan noise is not generated.

Figure 5:
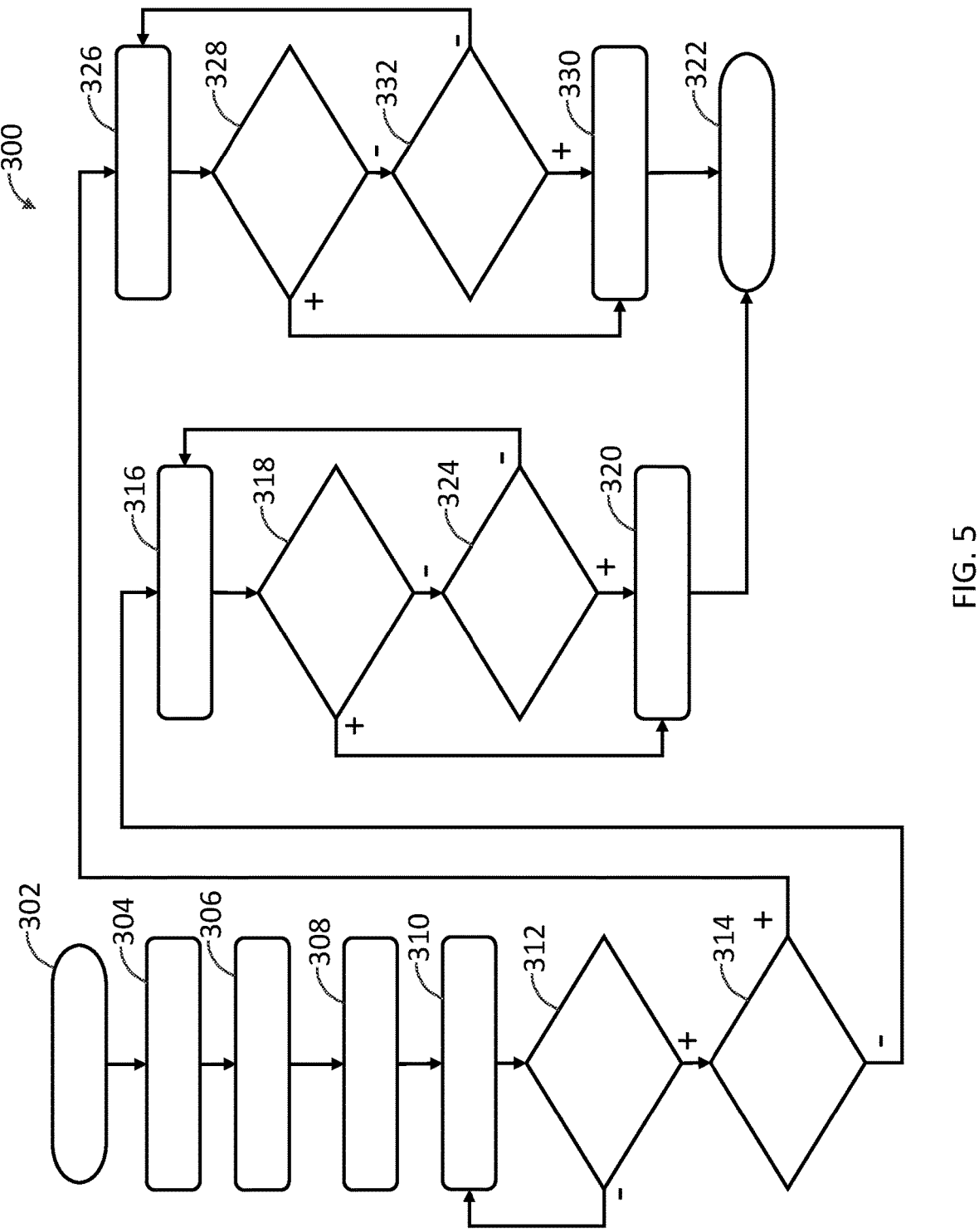
FIG. 5 is a flowchart of a process for braking system control with an initial cycle with ignition in connection with the vehicle and the control system of FIG. 1 and the braking system of FIG. 2, in accordance with an exemplary embodiment.

With reference to FIG. 5, a flowchart illustrates a process 300 for controlling operation of the braking system 104 of FIGS. 1 and 2 in accordance with exemplary embodiments. As will be appreciated in light of this disclosure, the order of operations within the process 300 is not limited to the sequential execution as illustrated in FIG. 5 and may be performed in one or more varying orders as applicable and in accordance with the present disclosure. In additional embodiments, additional steps may be included in the process 300 and/or some steps may be omitted from the process 300.

In various embodiments, the process 300 may be implemented in connection with the vehicle 100 of FIG. 1 and the braking system 104 thereof, including the control system 114 and the controller 130 thereof. Groan, which may be referred to as brake creep groan, is a noise that may be observed when the vehicle 100 is starting to move from a stopped condition with brake pressure applied. Motion takes place when brake pressure is reduced while a motive force is present, such as an idling engine through an automatic transmission of the powertrain system 102, or such as gravity due to the vehicle 100 being on a slope. The vibration causing the sound may result from friction force variation in stick-slip mode. The generation of groan may be dependent on various parameters in addition to the design of the braking system 104 itself. For example, the suspension structure of the vehicle 100 may contribute to groan generation. As a result, simple changes to the braking system 104, such as using a different friction material, may not stop groan generation. Accordingly, the process 300 provides a solution to avoid groan generation without physical system changes.

As depicted in FIG. 5, the process 300 may begin 302, such as when operation of the vehicle 100 is started. In certain embodiments, the process 300 begins 302 when one or more events occur to indicate that operation of the vehicle 100 is taking place or about to take place, such as a driver, operator, or passenger entering the vehicle 100, the brake apply actuator 148 (pedal) being operated 304, the ignition (such as may be part of the other sensors 120) being turned on 306, and a transmission (such as of the powertrain system 102) being shifted 308 into a "drive" mode, or the like. In various embodiments, the event(s) triggering the starting of the process 300 are determined based on sensor data from one or more of the other sensors 120 of FIG. 1 (e.g., from ignition sensors in certain embodiments). Also in certain embodiments, the control system 114 is turned on, or "woken up" as part of begin step 302 or the brake apply actuator 148 being operated 304.

The process 300 then monitors the sensor array 110 and in particular includes release monitoring 310 of the brake apply actuator 148. During release monitoring 310 of the brake apply actuator 148, the controller 130, through the processor 132 operates the braking system 104 including the pressure booster 174, via the actuator 176, the inlet valves 211-214 and the outlet valves 221-224 to reduce pressure at the corners 281-284 (wheel brake actuators 151-154). As noted above release of the brake actuator results in reducing pressure in the braking system 104 and at a point results in movement of the vehicle 100 with rotation of the rotors 201-204. Movement of the rotors 201-204 with some force still applied thereto by the friction pads 191-194 results in the possibility that brake groan will arise due to an incursion with the noise zone 250.

The process 300 continues with a determination 312, such as by the processor 132 of the controller 130, as to whether an upper target pressure is reached. For example, the upper target pressure may be the pressure at the point 271 of FIG. 4 as indicated by the boost pressure sensor 232. When the determination 312 is negative, meaning the boost pressure is above and has not reduced to the upper target pressure, the process 300 returns to release monitoring 310. When the release monitoring 310 leads to a determination 312 that the upper target pressure is reached, the process 300 is approaching groan avoidance control but first determines 314, such as by the processor 132 with input from the other sensors 120, whether the vehicle 100 is on a sloped road. For example, the other sensors 120 may include an inertial measurement unit (IMU). The inertial measurement unit may include accelerometers and gyroscopes, which may be in electronic form to provide motion, position, and navigational sensing over a number of degrees of freedom. For example, microelectromechanical system (MEMS) devices may be used to sense translation such as surge, heave, sway and rotation such as roll, pitch and yaw. In other examples, another type of sensor may be employed to detect road slope. Road slope is determined 314 because with different road slopes the noise zone 250 may be different and the control parameters may be different. Accordingly, the memory 134 may have lookup tables or other stored values 144 calibrated for different slope values providing different control points for the inlet valves 211-214 and the outlet valves 221-224.

When the determination 314 is negative, meaning the road is not sloped, at least not above a threshold value that would affect the noise zone 250, the process 300 proceeds to control 316 any number of the inlet valves 211-214 and any number of the outlet valves 221-224 to avoid the noise zone 250 using the calibration values for a normal (non-sloped) road, which may be obtained from the memory 134. For example, the inlet valves 211-214 and the outlet valves 221-224 may be controlled as described in relation to FIG. 4 to avoid the noise zone 250. In some embodiments, the boost actuator 176 may also be controlled to regulate deceleration of the vehicle 100 and/or to avoid groan.

The process 300 continues with determining 318, as to whether there is an increase in pressure at the brake apply actuator 148. For example, during brake release, the operator may reapply the brakes due to operating conditions. When the determination 318 is positive and pressure is increased at the brake apply actuator 148 so that the noise zone 250 will not be entered, the process 300 proceeds to exit 320 groan avoidance and controls the inlet valves 211-214 and the outlet valves 221-224 in normal operation and when the friction drops below a threshold level the vehicle 100 moves 322. In some embodiments, rather than move to the exit 320 step, the process 300 may return to the control 316 step to avoid groan and may proceed therefrom.

When the determination 318 is negative, meaning the pressure at the brake apply actuator 148 is not increased, the process 300 proceeds to determine 324, whether the pressure at the boost pressure sensor 232 has reached a lower target pressure. For example, the lower target pressure may be the pressure at the point 275 of FIG. 4 as indicated by the boost pressure sensor 232. When the determination 324 is negative, meaning the boost pressure has not reduced to the lower target pressure, the process 300 returns to the control 316 step to control groan and may proceed therefrom. When the determination 324 is positive, meaning the boost pressure has reduced to the lower target pressure, the process 300 proceeds to exit 320 groan avoidance and controls the inlet valves 211-214 and the outlet valves 221-224 in normal operation and when the friction drops below a threshold level the vehicle 100 moves 322. For example, the control may be along segments 278 and 279 of FIG. 4.

Returning to the determination 314, when the outcome is positive, meaning the road is sloped, at least above a threshold value that would affect the noise zone 250, the process 300 proceeds to control 326 any number of the inlet valves 211-214 and any number of the outlet valves 221-224 to avoid the noise zone 250 using the calibration values for the extent to which the road is sloped, such as may be obtained from the memory 134. For example, the inlet valves 211-214 and the outlet valves 221-224 may be controlled 326 similar to that described in relation to FIG. 4 to avoid the noise zone 250. In some embodiments, the boost actuator 176 may also be controlled to avoid groan.

The process 300 continues with determining 328, whether there is an increase in pressure at the brake apply actuator 148. For example, during brake release, the operator may reapply the brakes due to operating conditions. When the determination 328 is positive and pressure is increased and will not enter the noise zone 250, the process 300 proceeds to exit 330 groan avoidance and controls the inlet valves 211-214 and the outlet valves 221-224 in normal operation and when the friction drops below a threshold level the vehicle 100 moves 322. In some embodiments, rather than move to the exit 330 step, the process 300 may return to the control 326 step and may proceed therefrom.

When the determination 328 is negative, meaning the pressure at the brake apply actuator 148 is not increased, the process 300 continues with groan avoidance control and proceeds to determine 332, whether the pressure at the boost pressure sensor 232 has reached a lower target pressure. For example, the lower target pressure may be the pressure at the point 275 of FIG. 4 as indicated by the boost pressure sensor 232. When the determination 332 is negative, meaning the boost pressure has not reduced to the lower target pressure, the process 300 returns to the control 326 step and may proceed therefrom. When the determination 332 is positive, meaning the boost pressure has reduced to the lower target pressure, the noise zone 250 is avoided and the process 300 proceeds to exit 330 groan avoidance and controls the inlet valves 211-214 and the outlet valves 221-224 in normal operation and when the friction drops below a threshold level the vehicle 100 moves 322. For example, the control may follow the segments 278, 279 of FIG. 4.

Figure 6:
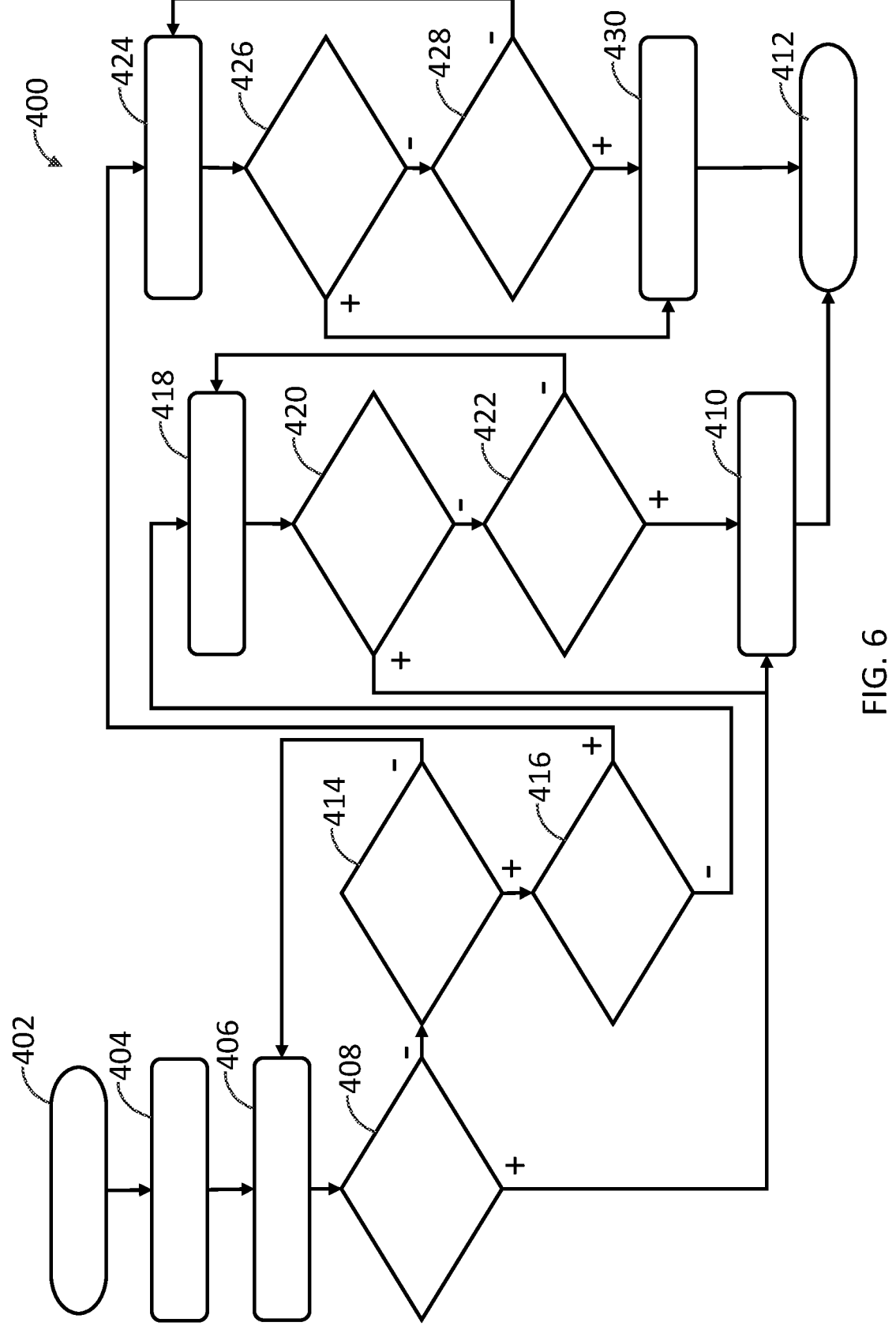
FIG. 6 is a flowchart of a process for braking system control after driving in connection with the vehicle and the control system of FIG. 1 and the engine system of FIG. 2, in accordance with an exemplary embodiment.

Referring to FIG. 6, a process 400 is illustrated that is applicable to continuing operation of the vehicle 100 and the braking system 104 after an initial start. The process 400 begins 402 and, such as by the controller 130 from inputs from the brake apply sensor 230, monitors 404, for an application of the brake apply actuator 148 followed by a release 406 action of the brake apply actuator 148. The process 400 proceeds to determine 408, such as by the processor 132, whether either the number of brake applications since the initial start of the vehicle exceeds a threshold number value or the speed of the vehicle 100 is over a threshold speed value. For example, the controller 130, may monitor and count brake applications via the brake apply sensor 230 and store the tallied values in the memory 134 for recall in the determination 408. Also, for example, the other sensors 120 may include a vehicle speed sensor that may be monitored by the controller 130. The determination 408 is conducted because after a threshold number of brake applications the risk of generating groan noise subsides, for example because brake temperatures have increased. The determination 408 is also conducted because above a threshold speed of the vehicle 100, the risk of generating groan noise dissipates.

When the determination is positive, meaning at least one of the number of brake applications since the initial start of the vehicle 100 exceeds a threshold number value or the speed of the vehicle 100 is over a threshold speed value, the process 400 proceeds to exit 410 groan avoidance and controls the inlet valves 211-214 and the outlet valves 221-224 in normal operation without a groan avoidance mode and when the friction drops below a threshold level the vehicle 100 moves 412.

Returning to the determination 408, when the outcome is negative, meaning neither the number of brake applications since the initial start of the vehicle exceeds a threshold number value or the speed of the vehicle 100 is over a threshold speed value, the process 400 continues with a determination 414. The determination 414 may be carried out by the processor 132 of the controller 130, as to whether an upper target pressure is reached. For example, the upper target pressure may be the pressure at the point 271 of FIG. 4 as indicated by the boost pressure sensor 232. When the determination 414 is negative, meaning the boost pressure has not reduced to the upper target pressure, the process 400 returns to release 406 monitoring and proceeds therefrom. When the determination 414 is positive and concludes that the upper target pressure is reached, the process 400 proceeds to determine 416, such as by the processor 132 with input from the other sensors 120, whether the vehicle 100 is on a sloped road. For example, the other sensors 120 may include an IMU. In other examples, another type of sensor may be employed to detect road slope. Road slope is determined 416 because with different road slope the noise zone 250 may be different and the control parameters may be different. Accordingly, the memory 134 may have lookup tables or other stored values 144 calibrated for slope values providing different control points for the inlet valves 211-214 and the outlet valves 221-224.

When the determination 414 is negative, meaning the road is not sloped, at least not above a threshold value that would affect the noise zone 250, the process 400 proceeds to control 418 any number of the inlet valves 211-214 and any number of the outlet valves 221-224 to avoid the noise zone 250 using the calibration values for a normal (non-sloped) road. For example, the inlet valves 211-214 and the outlet valves 221-224 may be controlled as described in relation to FIG. 4 to avoid the noise zone 250. In some embodiments, the boost actuator 176 may also be controlled to avoid groan.

The process 400 continues with determining 420, whether there is an increase in pressure at the brake apply actuator 148. For example, during brake release, the operator may reapply the brakes due to operating conditions. When the determination 420 is positive and pressure is increased and will not enter the noise zone 250, the process 400 proceeds to exit 410 groan avoidance and controls the inlet valves 211-214 and the outlet valves 221-224 in normal operation and when the friction drops below a threshold level the vehicle 100 moves 412. In some embodiments, rather than move to the exit 410 step, the process 400 may return to the control 418 step and may proceed therefrom.

When the determination 420 is negative, meaning the pressure at the brake apply actuator 148 is not increased, the process 400 proceeds to determine 422, whether the pressure at the boost pressure sensor 232 has reached a lower target pressure. For example, the lower target pressure may be the pressure at the point 275 of FIG. 4 as indicated by the boost pressure sensor 232. When the determination 422 is negative, meaning the boost pressure has not reduced to the lower target pressure, the process 400 returns to the control 418 step in the groan avoidance mode and may proceed therefrom. When the determination 422 is positive, meaning the boost pressure has reduced to the lower target pressure, the process 400 proceeds to exit 410 groan avoidance and controls the inlet valves 211-214 and the outlet valves 221-224 in normal operation, such as along segments 278, 279 of FIG. 4, and when the friction drops below a threshold level the vehicle 100 moves 412.

Returning to the determination 416, when the outcome is positive, meaning the road is sloped, at least above a threshold value that would affect the noise zone 250, the process 400 proceeds to control 424 any number of the inlet valves 211-214 and any number of the outlet valves 221-224 to avoid the noise zone 250 using the calibration values for the extent to which the road is sloped. For example, the inlet valves 211-214 and the outlet valves 221-224 may be controlled 424 similar to that described in relation to FIG. 4 to avoid the noise zone 250 using stored values from the memory 134 for the slope of the road. In some embodiments, the boost actuator 176 may also be controlled to avoid groan.

The process 400 continues with determining 426, whether there is an increase in pressure at the brake apply actuator 148. For example, during brake release, the operator may reapply the brakes due to operating conditions. When the determination 426 is positive and pressure is increased and will not enter the noise zone 250, the process 400 proceeds to exit 430 groan avoidance and controls the inlet valves 211-214 and the outlet valves 221-224 in normal operation and when the friction drops below a threshold level the vehicle 100 moves 412. In some embodiments, rather than move to the exit 430 step, the process 400 may return to the control 424 step and may proceed therefrom.

When the determination 426 is negative, meaning the pressure at the brake apply actuator 148 is not increased, the process 400 proceeds to determine 428, whether the pressure at the boost pressure sensor 232 has reached a lower target pressure. For example, the lower target pressure may be the pressure at the point 275 of FIG. 4 as indicated by the boost pressure sensor 232. When the determination 428 is negative, meaning the boost pressure has not reduced to the lower target pressure, the process 400 returns to the control 424 step with control in the groan avoidance mode and may proceed therefrom. When the determination 428 is positive, meaning the boost pressure has reduced to the lower target pressure, the process 400 proceeds to exit 430 groan avoidance and controls the inlet valves 211-214 and the outlet valves 221-224 in normal operation and when the friction drops below a threshold level the vehicle 100 moves 412.

Accordingly, systems and methods provide braking system control to avoid groan conditions and thereby avoid undesirable noise. Braking pressures that have been classified as within a groan zone are avoided by selective operation of the vehicle's front and rear wheel brake actuators through control of their inlet and outlet valves. Individual control of the brake pressure at each vehicle corner avoids pressures that generate groan noise, without physical changes to the vehicle, such as to its braking system or its suspension system. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for controlling braking, the system having a brake actuator configured to apply a friction force to a moving member, a conduit system coupled with the brake actuator, an inlet valve in the conduit system configured to control fluid pressure delivered to the brake actuator, and an outlet valve in the conduit system configured to control fluid pressure released from the brake actuator, the system comprising:

a controller configured to:
    monitor for an upper target pressure condition in the system, wherein the upper target pressure condition is associated with a noise zone;
    operate, when the upper target pressure is detected and in a noise zone avoidance mode, the inlet valve and the outlet valve to avoid brake pressures that generate a brake noise from the friction force; and
    count a number of brake applications following a vehicle start event, and skip the monitor for the upper target pressure when the number of the brake applications exceeds a threshold value.

2. The system of claim 1, wherein the controller is configured to monitor for the vehicle start event and, following the vehicle start event, the controller is configured to conduct the monitor for the upper target pressure condition in the system.

3. The system of claim 1, wherein the controller is configured to monitor the brake applications via a brake apply sensor, store count values in a memory, and recall the count values for comparison to the threshold value.

4. The system of claim 1, wherein the controller is configured to determine, by a slope sensor, whether there is a slope that affects the brake noise, and when the slope is present, to operate, when the upper target pressure is detected, the inlet valve and the outlet valve in a slope mode.

5. The system of claim 1, wherein the controller is configured to:
    determine, via a brake apply actuator, if an increase in pressure is applied; and
    when the increase in pressure is applied, exit the noise zone avoidance mode.

6. The system of claim 1, comprising a vehicle that includes the system, wherein the controller is configured to:

determine whether the vehicle is operating on a slope;

when the vehicle is not operating on the slope, operate, when the upper target pressure is detected, the inlet valve and the outlet valve in a normal mode; and when the vehicle is operating on the slope, operate, when the upper target pressure is detected, the inlet valve and the outlet valve in a slope mode that is different than the normal mode and that is tailored to the slope.

7. The system of claim 1, wherein the controller is configured to determine whether a lower pressure target is detected, and when the lower pressure target is detected exit the noise zone avoidance mode.

8. The system of claim 1, wherein the controller is configured to determine whether a lower pressure target is detected, and when the lower pressure target is not detected, continue to operate in the noise zone avoidance mode.

9. The system of claim 1, comprising a vehicle that includes the system, wherein the controller is configured to:

determine, by a speed sensor, a speed of the vehicle; and skip the monitor for the upper target pressure when the speed exceeds a threshold value.

10. The system of claim 1, comprising a pressure booster, wherein the controller is configured to control the pressure booster to regulate deceleration.

11. A method for controlling a braking system, the method comprising:

applying, by a brake actuator, a friction force to a moving member;

coupling a conduit system with the brake actuator;

controlling, by an inlet valve in the conduit system, a fluid pressure delivered to the brake actuator;

controlling, by an outlet valve in the conduit system the fluid pressure released from the brake actuator;

monitoring, by a controller, for an upper target pressure condition in the system, the upper target pressure condition associated with a noise zone;

operating, by the controller when the upper target pressure is detected and in a noise zone avoidance mode, the inlet valve and the outlet valve to avoid brake pressures that generate a brake noise from the friction force;

determining, by the controller referencing a slope sensor, whether there is a slope that affects the brake noise; and operating by the controller, when the slope is present and when the upper target pressure is detected, the inlet valve and the outlet valve in a slope mode.

12. The method of claim 11, comprising:

monitoring, by the controller, for a vehicle start event; and, following the vehicle start event, conducting the monitoring for the upper target pressure condition in the system.

13. The method of claim 11, comprising:

counting, by the controller, a number of brake applications following a vehicle start event; and when the number of the brake applications exceeds a threshold value, skipping, by the controller, the monitoring for the upper target pressure.

14. The method of claim 11, comprising:

reading, from memory, stored values calibrated for slope values that provide control points for valves in the braking system corresponding to the slope; and actuating the valves using the control points.

15. The method of claim 11, comprising:

determining, by the controller referencing a brake apply actuator, if an increase in pressure is applied; and exiting, by the controller when the increase in pressure is applied, the noise zone avoidance mode.

16. The method of claim 11, comprising:

including the braking system in a vehicle;

determining, by the controller, whether the vehicle is operating on the slope;

operating, when the vehicle is not operating on the slope and the upper target pressure is detected, the inlet valve and the outlet valve in a normal mode; and operating, by the controller, when the vehicle is operating on the slope and the upper target pressure is detected, the inlet valve and the outlet valve in a slope mode that is different than the normal mode and that is tailored to the slope.

17. The method of claim 11, wherein the controller is configured to determine whether a lower pressure target is detected, and when the lower pressure target is detected exit the noise zone avoidance mode.

18. The method of claim 11, comprising:

determining, by the controller, whether a lower pressure target is detected; and when the lower pressure target is not detected, continuing to operate, by the controller, in the noise zone avoidance mode.

19. The method of claim 11, comprising:

including the braking system in a vehicle determining, by the controller referencing a speed sensor, a speed of the vehicle; and when the speed exceeds a threshold value, skipping, by the controller, the monitoring for the upper target pressure.

20. A vehicle with a system for controlling braking, the vehicle comprising:

a brake actuator configured to apply a friction force to a moving member;

a conduit system coupled with the brake actuator;

an inlet valve in the conduit system configured to control fluid pressure delivered to the brake actuator;

an outlet valve in the conduit system configured to control fluid pressure released from the brake actuator; and a controller configured to:

monitor for an upper target pressure condition in the system;

operate, when the upper target pressure is detected and in a noise zone avoidance mode, the inlet valve and the outlet valve to avoid brake pressures that generate a brake noise from the friction force;

determine whether the vehicle is operating on a slope;

operate, when the vehicle is not operating on the slope and the upper target pressure is detected, the inlet valve and the outlet valve in a normal mode; and operate, when the vehicle is operating on the slope and the upper target pressure is detected, the inlet valve and the outlet valve in a slope mode that is different than the normal mode and that is tailored to the slope.

\* \* \* \* \*